United States Patent [19]
Udd

[11] Patent Number: 5,223,967
[45] Date of Patent: Jun. 29, 1993

[54] SECURE COMMUNICATIONS SYSTEM

[75] Inventor: Eric Udd, Huntington Beach, Calif.

[73] Assignee: McDonnell Douglas Corporation, Long Beach, Calif.

[21] Appl. No.: 880,684

[22] Filed: Jun. 11, 1986

[51] Int. Cl.$^5$ .................................. H04B 10/02
[52] U.S. Cl. .................... 359/119; 359/118; 359/164; 359/173; 359/183; 359/188; 359/195
[58] Field of Search ............ 455/605, 606, 615, 616; 356/350; 367/149; 359/111, 118, 119, 122, 154, 156, 164, 168, 173, 183, 188, 192, 195

[56] References Cited

U.S. PATENT DOCUMENTS

| | | | |
|---|---|---|---|
| 2,531,951 | 11/1950 | Shamos et al. | 455/616 |
| 2,707,749 | 5/1955 | Mueller | 455/616 |
| 3,366,792 | 1/1968 | Ohm | 455/616 |
| 3,408,498 | 10/1968 | Ohm | 455/616 |
| 3,495,189 | 2/1970 | Craw | 455/616 |
| 3,584,220 | 6/1971 | Nomura et al. | 455/605 |
| 3,828,185 | 8/1974 | Vandling | 455/605 |
| 3,936,748 | 2/1976 | Bomke | 455/616 |
| 4,002,896 | 1/1977 | Davies et al. | 455/616 |
| 4,187,404 | 2/1980 | Deman et al. | 455/605 X |
| 4,433,915 | 2/1984 | Hanse | 356/350 |
| 4,434,510 | 2/1984 | Lemelson | 455/606 X |
| 4,456,376 | 6/1984 | Carrington et al. | 356/350 |
| 4,456,377 | 6/1984 | Shaw et al. | 356/350 |
| 4,479,264 | 10/1984 | Lockett et al. | 455/606 |
| 4,482,980 | 11/1984 | Korowitz et al. | 455/606 X |
| 4,540,243 | 9/1985 | Fergason | 455/616 |
| 4,642,804 | 2/1987 | Personick | 455/606 X |
| 4,658,394 | 4/1987 | Cheng et al. | 455/606 X |
| 4,736,465 | 4/1988 | Bobey et al. | 455/606 X |

FOREIGN PATENT DOCUMENTS

| | | | |
|---|---|---|---|
| 0087946 | 7/1981 | Japan | 455/605 |
| 0103549 | 8/1981 | Japan | 455/606 |
| 0023343 | 2/1982 | Japan | 455/606 |
| 1577603 | 10/1980 | United Kingdom | 455/606 |

OTHER PUBLICATIONS

Nagata et al, "Intra-Office Optical Fiber Transmission Systems"; Rev. of the Electrical Comm. Labs; vol. 27, No. 11-12; Nov.-Dec., 1979; pp. 1057-1068.
Cheng et al, "Subscriber Loop Architecture"; *Technical Digest;* No. 75, Sep. 1984, pp. 9-10.

*Primary Examiner*—Bernarr E. Gregory
*Attorney, Agent, or Firm*—Donald E. Stout; John P. Scholl

[57] ABSTRACT

There is provided by this invention a secure fiber optic communication system based on the Sagnac interferometer that allows multiple authorized users to communicate on the system by modulation and detection of two counterpropagating light beams. The security of the system is based on a combination of the information being modulated on the relative phase difference between the counterpropagating light beams and the low coherence length of the light source. In order for an intruder to intercept the signal, both counterpropagating beams must be accessed and the pathlength of the two beams matched to within a few coherence lengths of the light source so that an amplitude modulated output signal may be constructed. The system is further comprised of a random pathlength generator used to randomly vary the relative pathlength of the two counterpropagating beams. A light level alarm is provided that detects changes in the light level within the system. If the signal level changes sufficiently, the light level alarm shuts down the system.

34 Claims, 11 Drawing Sheets

SECURE COMMUNICATIONS SYSTEM

BACKGROUND OF THE INVENTION

1. FIELD OF THE INVENTION

This invention relates generally to fiber optic communication systems and, more particularly, to Sagnac interferometer based fiber optic systems that utilize counterprogagating light paths to form a fiber optic communications loop that may be accessed by a multitude of authorized users at predetermined data entry points.

2. DESCRIPTION OF THE PRIOR ART

The need for high bandwidth secure communication systems that are amenable to uses in networks and minimize the need for encryption is expected to become increasingly acute in the near future. Long-term trends for very high bandwidth sensors, computers, and multichannel video display capabilities will dictate this type of technology. The advent of fiber optics has opened up a new area where very high speed, low cost telecommunication is possible.

SUMMARY OF THE INVENTION

There is provided by this invention a Sagnac interferometer based secure communication system using a short, coherence length source in combination with counterpropagating paths that have inherent self-matching characteristics to make an intrusion resistant telecommunications link. In one of the simplest forms of the Sagnac interferometer based secure communication system, light from a broadband light source such as a light emitting diode is directed into a beamsplitter. One part of the beam is directed toward a detector which monitors amplitude fluctuations of the light source. The other part of the light beam is directed through polarizing and spatial filter elements that are used to ensure that counterpropagating beams through the interferometer loop transverse the same path. The light beam that is conditioned by these elements is coupled into counterpropagating light beams in the interferometer loop by a second beamsplitter. Data is impressed upon the counterpropagating light beams by modulating their relative phase. When the two beams of light recombine on the second beamsplitter, their difference in phase causes the light beam that returns via the polarizing and spatial filter elements to be amplitude modulated. When the combined beams return to the first beamsplitter, a portion of this amplitude modulated light beam is directed into a detector which converts the light signal into a amplitude modulated electrical signal corresponding to the data impressed onto the light beam. The light source, beamsplitter, beam conditioning optics, detector and associated support electronics constitute the receiver for the system. The optical and electrical support elements used to impress the relative phase difference between the counterpropagating light beams is the transmitter for the system.

The security of the system is based on a combination of the information being impressed on the relative phase difference between the counterpropagating light beams and the low coherence length of the light source. In order for an intruder to intercept the signal, both counterpropagating beams must be accessed and the pathlength of the two beams matched to within a few coherence lengths of the light source so that an amplitude modulated output signal may be constructed. Since the counterpropagating pathlengths may differ by kilometers at the point of interception and the coherence length of a low coherence light source such as light emitting or superradiant diode may be on the order of 30 microns, this is an extremely difficult and time consuming task analogous to finding a needle in a haystack. What makes this system extremely secure is that a random pathlength generator is used to randomly vary the relative pathlength of the two counterpropagating beams. This is equivalent to having the needle in the haystack moved randomly throughout the haystack. In the unlikely event the intruder manages to achieve the pathlength matching condition, a new equally difficult pathlength condition chosen totally at random occurs a short time later. The situation is analogous to luckily stumbling on the needle in the haystack only to have it hidden once again at some random location in the haystack an instant later.

It is an object of this invention to provide a secure single mode optical fiber communication link having very high bandwidths, such that long repeaterless links are possible.

It is an object of this invention to use low cost single mode fiber telecommunication technology. It is another object of this invention to provide a system that is amendable to uses by multiple users and networking arrangements. It is an object of this invention to send information at high data rates, using frequency shifters, phase modulators, tap-resistant single mode fibers, random optical pathlength generation, and random amplitude modulation of the system light sources, to prevent unauthorized intrusions. It is an object of this invention to provide flexible secure communication systems that offer adequate security at the lowest possible cost.

BRIEF DESCRIPTION OF THE DRAWINGS

FIGS. 18A, B, and C illustrate phase modulators for fiber optic communications systems;

BRIEF DESCRIPTION OF THE PREFERRED EMBODIMENT

The Sagnac interferometer based secure communication system is based upon the usage of a short coherence length light source in combination with the self matching characteristics of the Sagnac interferometer to make an intrusion resistant telecommunication link. Since the system is based on single-mode optical fiber, very high bandwidth and long repeaterless links are possible. Because the system takes advantage of conventional telecommunication components, the overall cost of the system can be very low.

Figure 1:
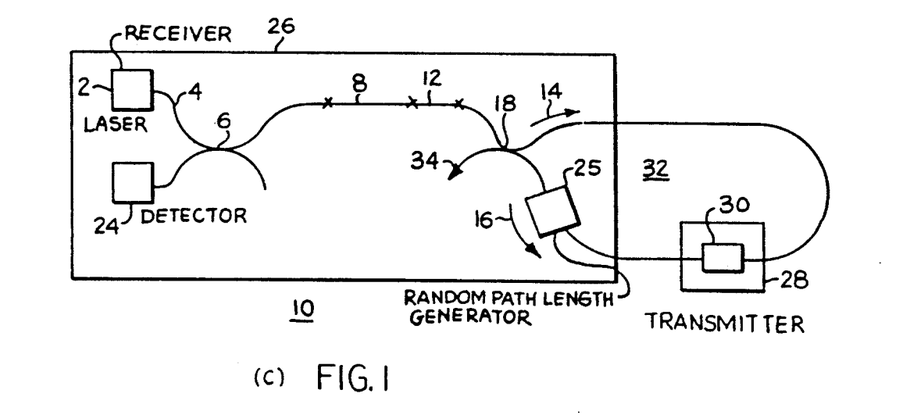
FIG. 1 is a schematical representation of a fiber optic communication system based on the sagnac interferometer that incorporates the principles of this invention.

Referring to FIG. 1, there is as shown a basic Sagnac interferometer based secure communication link 10. Light from a broadband low coherence length light source 2 is coupled into the input fiber 4. The light source may be a superradiant or light emitting diode. The light from the source 2 enters the input/output fiber coupler 6, and a portion of the light beam enters a polarizing element 8 that, in combination with the fiber spatial filter 12, is used to ensure the counterpropagating light beams in the Sagnac interferometer traverse the same path. The light beam is then split into the clockwise and counterclockwise propagating beams 14 and 16 by the central fiber coupler 18. These optical elements in combination with the detector 24, a random pathlength generator 25, and support electronics constitute the receiver 26 for the basic link 10. The simplest transmitter station 28 consists of a phase modulator element 30 that impresses a difference in phase between the counterpropagating beams 14 and 16 as they propagate through the Sagnac interferometer fiber loop 32. After passing through the loop, the two beams recombine on the fiber coupler 18 and, depending on their relative phase, either exit the system via the port 34 or return to the detector 24 via the elements 12, 8 and 6. In this manner the phase modulation signal impressed by the transmitter 28 is converted to an amplitude modulated signal at the receiver 26.

Figure 2:
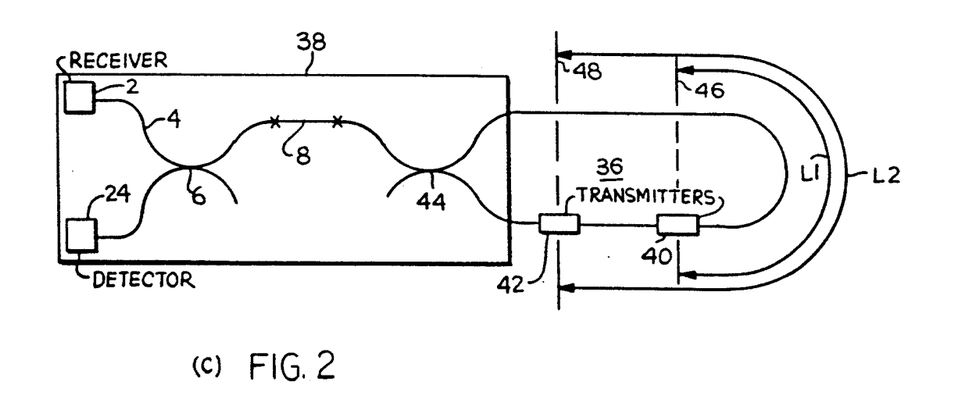
FIG. 2 illustrates a fiber optic communication system for multiple transmitting stations in the communications loop.

FIG. 2 illustrates one method of impressing relative phase differences between the counterpropagating light beams in the fiber loop 36 so that a signal may be transmitted from the transmitting station to the receiver 38. Two transmitting stations 40 and 42 are illustrated. Information may be impressed by the transmitting stations using a phase modulator that operates at high data rates over a characteristic period that depends on its position as is shown in FIG. 2.

In particular, the transmitting station 40 is located a distance $(L-L_1)/2$ in a counterclockwise direction from the beamsplitter 44 where L is the length of the fiber loop 36 and $L_1$ is the distance between the transmitting station 40 and the symmetrically placed position 46 that is also a distance $(L-L_1)/2$ from the beamsplitter 44. One means to impress phase information onto the counterpropagating light beams is to operate the phase modulator of the transmitting station 40 over the time interval $[0, L_1 n.c]$ at high data rates, wait during the time interval $[L_1 n/c, 2L_1 n/c]$, transmit during $[2L_1 n/c, 3L_1 n/c]$, wait during $[3L_1 n/c, 4L_1 n/c]$ and so forth. Where n is the index of refraction of the optical fiber and c is the speed of light in a vacuum.

Figure 3:
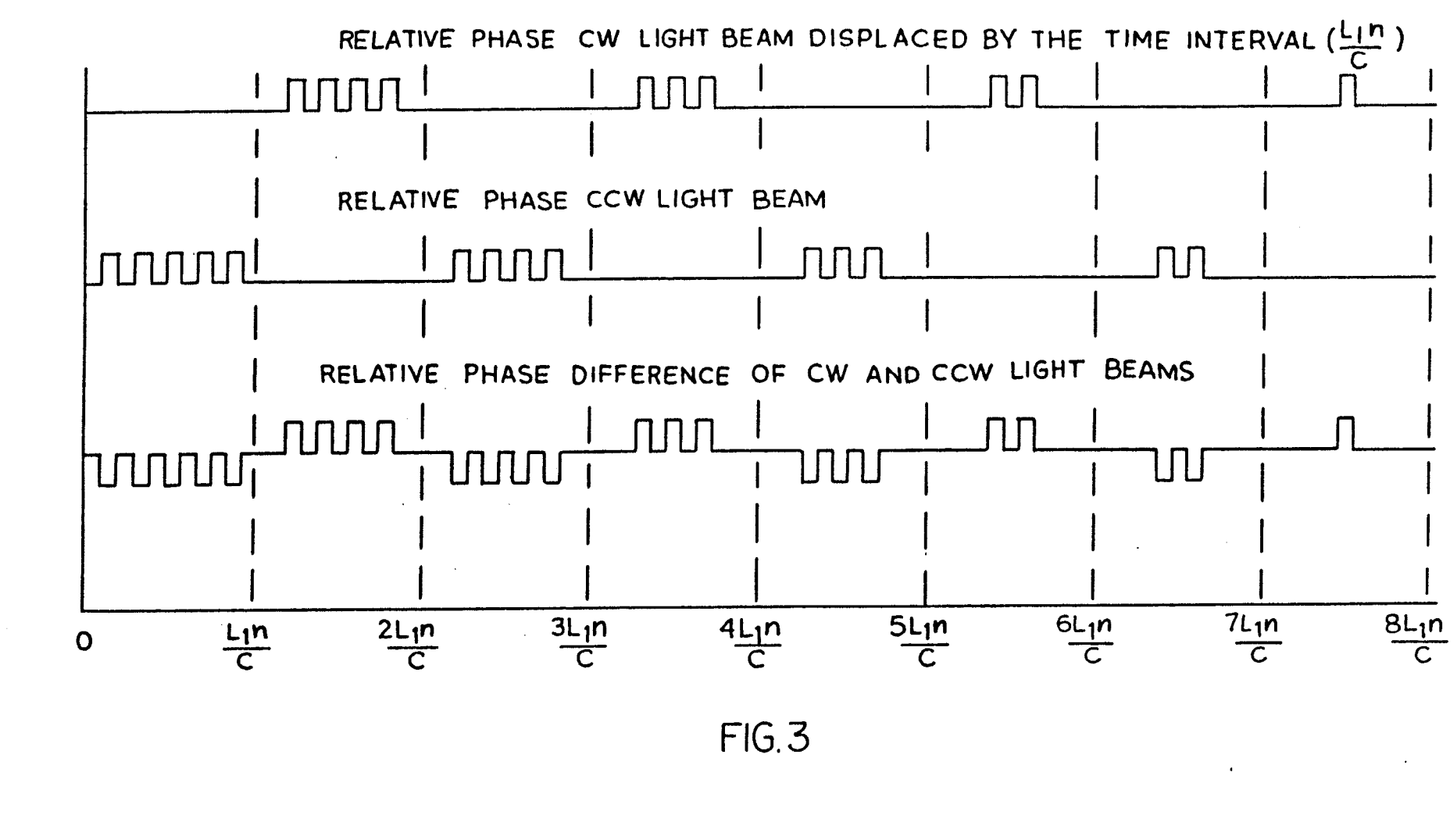
FIG. 3 illustrates a timing diagram for the phase information impressed on the counterpropagating beams in the communications loop of FIG. 2.

A timing diagram illustrating the phase information impressed upon the clockwise and counterclockwise beams and the resulting amplitude modulation due to their relative phase difference when the two beams recombine on the detector is shown by FIG. 3. The diagram corresponds to the situation for transmitter 40 of FIG. 2. The sequence starts at time zero when a stream of five bits of information are impressed over the time interval $[0, L_1 n/c]$ by shifting the phase of the counterclockwise ccw light beam which originates at the location of the transmitter 40. Meanwhile, the clockwise cw light beam originating from the location 46 propagates through the fiber length $L_1$, and arrives at the transmitter 40. Over the next time interval $[L_1 n/c, 2L_1 n/c]$ the phase modulator of transmitter 40 is turned off so the counterpropagating light beams are not phase modulated. Since the two counterpropagating light beams that enter the system through the splitter 44 arrive at the location 46 and 40 simultaneously, this means that the cw light beam that will mix with the ccw light beam modulated over the time interval $[0, L_1 n/c]$ passes through the transmitter 40 over the time interval $[L_1 n/c, 2L_1 n/c]$. For ease of comparison, the relative phase modulation of the cw beam is moved back in time by an interval $L_1 n/c$ on the timing diagram of FIG. 3 and thus the interval $[0, L_1 n/c]$ corresponds to $[L_1 n/c, 2L_1 n/c]$ for the cw beam, and so forth. When the two beams are recombined at the beamsplitter 44 after propagating through the fiber loop 36, the two beams have a relative phase difference which is the difference between the cw and ccw timing diagram lines of FIG. 3 as is shown at the bottom of the timing diagram. Notice that the information packet is repeated twice when the two beams are recombined but that the sign of the relative phase changes. It is also possible to impress relative phase differences between the counterpropagating beams that may be used for data transmission by many other methods that are apparent to those skilled in the art including differentiating methods over successive time intervals.

Figure 4:
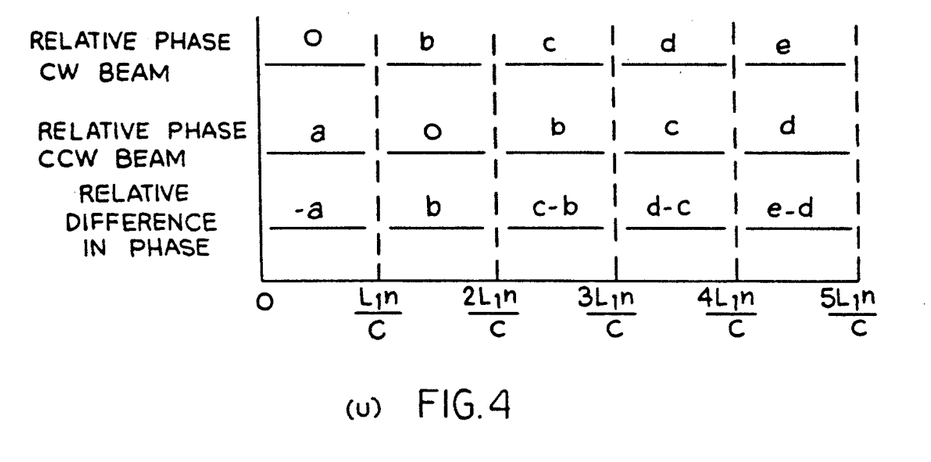
FIG. 4 illustrates the relative phase changes of information impressed on the counterpropagating beams in FIG. 2 during the transmitting interval.

FIG. 4 shows how these methods would work in principal. The phase modulator of transmitter 40 is operated so that a succession of data bursts a, b, c, d and e are impressed upon the counterpropagating beams. The resultant output on the detector is then representative of the phase difference between the counterpropagating beams which in turn depends on the difference in phase modulation for successive data bursts.

The lowest noise, highest performance Sagnac interferometers employ broadband light sources with very low coherence lengths to reduce amplitude noise of the light source and spurious noise due to coherent backscatter throughout the fiber loop. Since information impressed upon the system depends upon the phase relationship between the counterpropagating light beams, the two beams must be mixed to extract the signal. Since recorders do not exist at the frequencies of $10^{14}$ Hz typical of light beams, this must be done in real time. An intruder trying to tap the system would first have to access both counterpropagating beams if the system were to be passively tapped.

Figure 5:
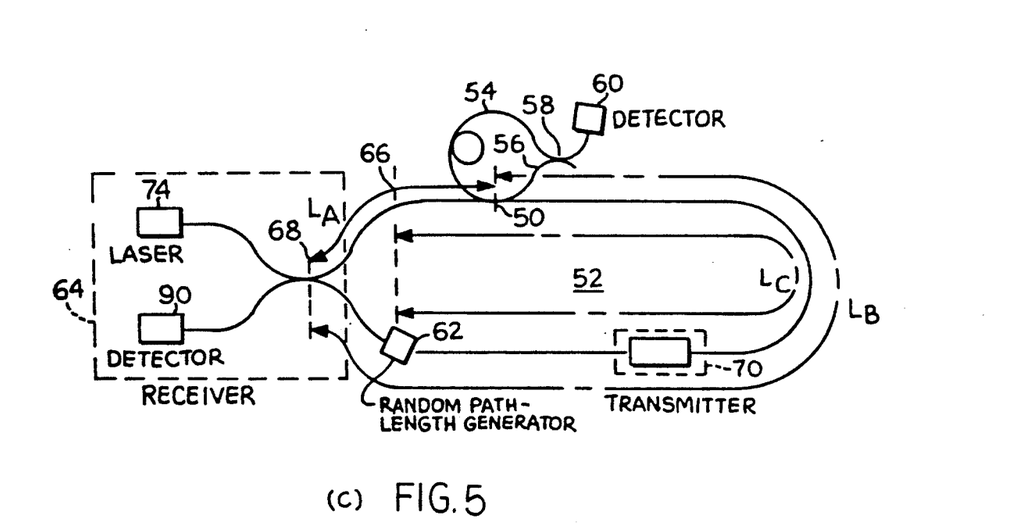
FIG. 5 illustrates a simple tap into a Sagnac interferometer based communications system.

FIG. 5 illustrates a simple tap of a secure Sagnac interferometer based communications system which consists of a beamsplitter 50 fused into the fiber loop 52. The two tapped counterpropagating light beams would then have to be pathlength matched to high accuracy before the signal could be extracted. For example, a conventional light emitting diode has a coherence length of about 35 microns. For a multikilometer system, the intruder would be faced with the prospect of matching multikilometer lengths to on the order of 30–40 microns. In particular for the situation shown by FIG. 5, the length of fiber length 54 should be matched to the distance $L_A$ and the fiber length 56 should be matched to the distance $L_B$ before the beams are combined on the beamsplitter 58 if the beams are to interfere, and an amplitude modulated signal will result on the detector 60. Matching kilometer lengths of fiber to distances on the order of 100 microns is an extremely difficult and time consuming task. The situation is analogous to looking for a needle in a haystack, and in many cases even the simplest system may provide sufficient security. For additional security the random pathlength generator 62 may be added to the system. This has the effect of randomly changing the pathlength of one of the fiber legs such as $L_B$. Since $L_B = L_{BO} + L(t)$ where $L_{BO}$ is the nominal length of the fiber leg and $L(t)$ is an arbitrary length function that is introduced at characteristic time intervals, the system becomes much more secure. The situation is analogous to randomly moving the needle throughout the haystack. The potential intruder is then faced with the formidable task of trying to achieve a very tight matching condition that is constantly changing. The receiver 64, however, resets quickly after a random pathlength charge is introduced. For a random pathlength generator 62 located in the fiber loop, the Sagnac interferometer resets itself due to its self matching characteristics in a time interval given by $L_c n/c$ where $L_c$ is the length of the fiber loop between the random pathlength generator 62 and the symmetry point 66 on the fiber loop 52 and opposite the central fiber beamsplitter 68. For a length $L_C$ of 20 kilometers, the system resets itself in about $10^{-4}$ seconds. Over this time interval information may not be transmitted to the receiver as the resulting combined beams will not be mutually coherent due to the random pathlength introduction. If the random pathlength generator shifts the pathlength at a 100 Hz rate for the 20 kilometer example, this would result in about a one percent loss in potential bandwidth. As an example, for the case where the random pathlength generator 62 is collocated with the transmitter station 70, signal drop out would occur over one of the timing intervals illustrated by FIGS. 3 and 4.

Figure 6:
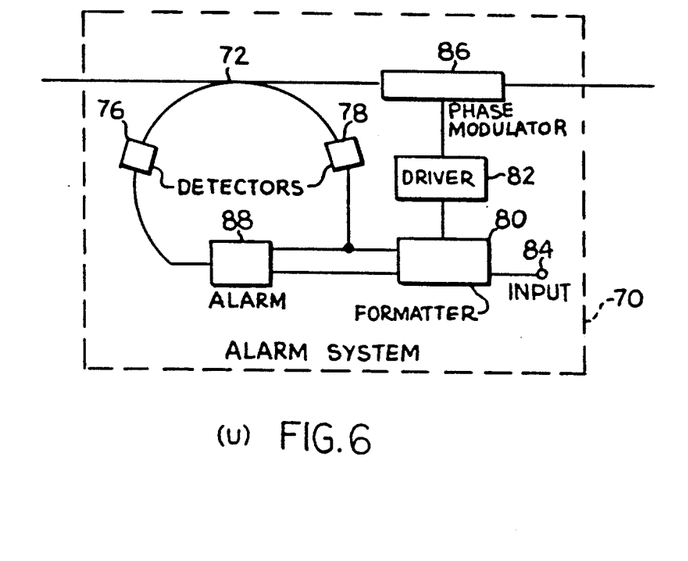
FIG. 6 illustrates a transmitter for a fiber optic communication system incorporating the principles of this invention.

In order to ensure the transmitting station 70 is aware of when a random pathlength change will be made in the generator 62, the transmitting station would have a fiber coupler 72 in place as is shown in FIG. 6. The receiving station 64 would send out a light pulse by amplitude modulating the light source 74 shown in FIG. 5 so that changes in the random pathlength generator 62 can be compensated for and, in the case of multiple transmitting stations, so that the receiver 64 can indicate to the transmitting station that it is its turn to send a message. The synchronization pulses would be sent just before the pathlength is switched so that the potential intruder could not use the timing of the pulses as a means to locate his position on the fiber loop. It is also possible to avoid the use of synchronization pulses for a single transmitter/receiver pair by locating the random pathlength generator at the transmitter or, alternatively, using repetitive data bursts of a duration longer than the expected signal drop out. The fiber beamsplitter 72 is used in combination with the light detectors 76 and 78 for synchronization purposes with the data formatter 80 and driver 82 that are used to impress the input data at terminal 84 onto the phase modulator 86. The second purpose of the fiber beamsplitter 72 and detectors 76 and 78 is to act as an alarm that will shut down the system if the light level changes more than a preset amount. The light level alarm system 88 looks for changes in the light level on detectors 76 and 78 as well as differences in the ratio of their intensity. If the signal level changes sufficiently, the light level alarm system shuts down the data formatter 80. Similar light level alarm systems may be used in the receiver 64 employing the detector 90 shown in FIG. 5.

Figure 7:
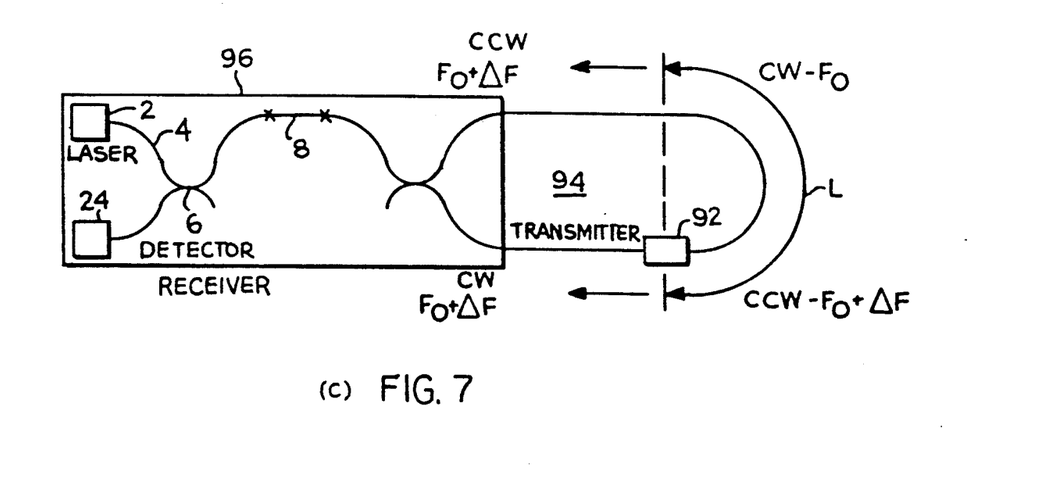
FIG. 7 illustrates a fiber optic communications system utilizing frequency shifters as signaling means.

In addition to phase modulation, it is also possible to impress information onto the system using frequency modulation. FIG. 7 shows a frequency modulator 92 placed in the fiber loop 94. The relative phase shift impressed by the frequency modulator 92 on the system depends upon the frequency shift $\Delta F$ that it induces and the characteristic length L which is twice the distance from the frequency modulator to the center of the fiber loop 94. Considerations here are similar to those of the phase modulator described earlier. The amount of phase modulation impressed is given by $2\pi \Delta F L n/C$. In order to avoid data collisions between the counterpropagating light beams cw and ccw, the data is repeated over each characteristic time interval $Ln/c$. That is, both beams return to the receiver 96 at the same frequency $F + \Delta F$ but since they differ by $\Delta F$ while propagating through the length of fiber of fiber L they differ in phase. By modulating $\Delta F$, a data stream may be impressed onto the system.

Figure 8:
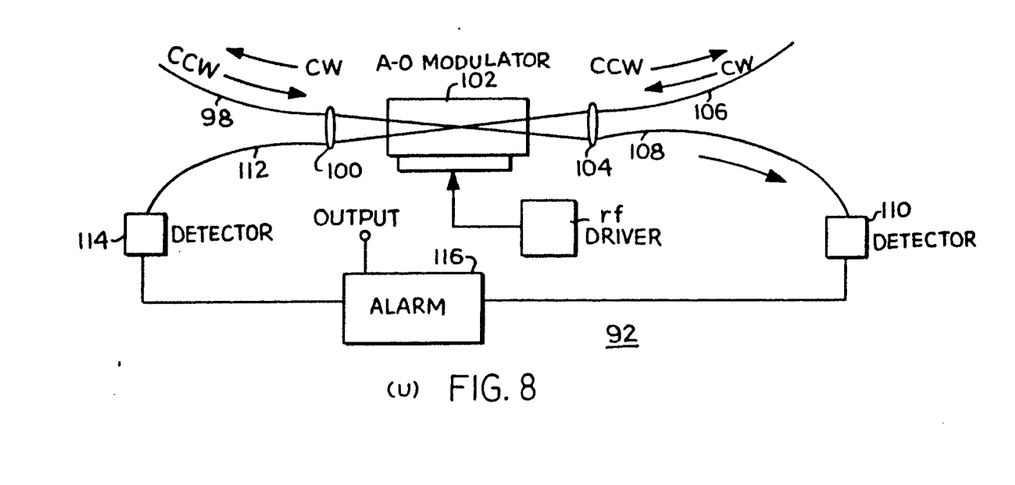
FIG. 8 illustrates an acousto-optic modulator for use with a fiber optic communications system.

The frequency shifter 92 employed is an acousto-optic modulator as shown in FIG. 8. The system has the additional security feature that only a selected band of light wavelengths propagate through the system. That is the ccw light beam that propagates through the fiber coil 94 to the fiber end 98, and its output is collimated by the lens 100 at the Bragg angle with respect to the acousto-optic modulator 102. The acousto-optic modulator 102 is driven by an rf driver. A portion of the ccw light beam is frequency shifted by the acousto-optic modulator 102 and directed by the lens 104 into the fiber end 106, and this beam completes its circuit through the fiber loop 94. Since the Bragg angle is wavelength dependent, only light of a defined wavelength band enters the fiber end 106; and in this manner the system is made secure from an intruder attempting to use a light beam outside of the detection band of the detectors of the system. The undiffracted portion of the ccw light beam is directed by the lens 104 into the fiber 108, which in turn directs the light beam to the alarm detector 110. For the cw propagating light beam, the situation is analogous with the diffracted light beam being directed by the lens 100 into the fiber end 98 to continue its circuit about the loop 94 and the undiffracted portion of the light beam being directed by the lens 100 into the fiber 112 where it is carried to the detector 114. A light level alarm 116 is used to monitor changes in the light level of the system in a manner hereinbefore described in FIG. 6. A simpler protection method would be to splice into the system a color filter which attenuates all wavelength bands except those detectable by the built-in alarm systems. This could be for example a length of specially doped single mode optical fiber.

Figure 9:
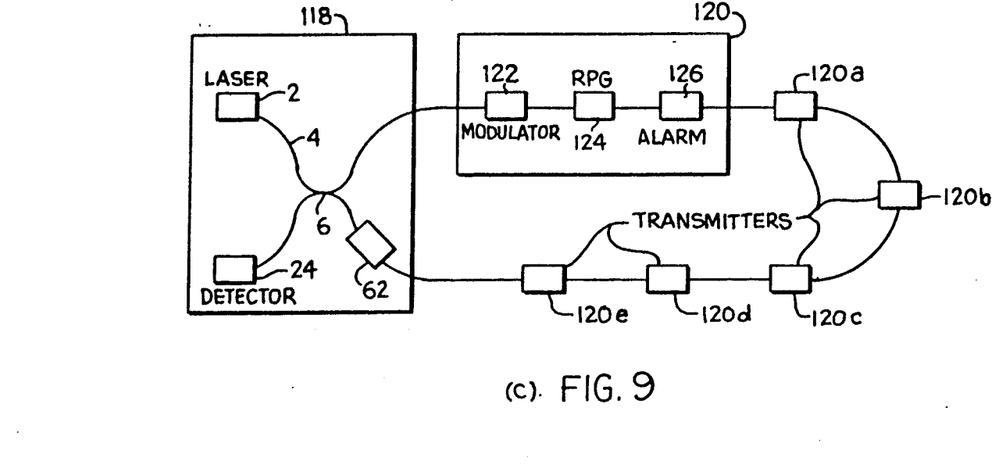
FIG. 9 illustrates a fiber optic communications system with multiple transmitting stations.

A single Sagnac interferometer based secure communication system loop may be expanded to include several transmitting stations. FIG. 9 shows a configuration consisting of one receiving station 118 and six transmitting or sending stations 120, and 120a–120e. Each of the transmitting stations such as 120 may consist of a phase modulator 122 to be used to impress the data, a random pathlength generator 124 for security, and a filter alarm system 126.

Figure 10:
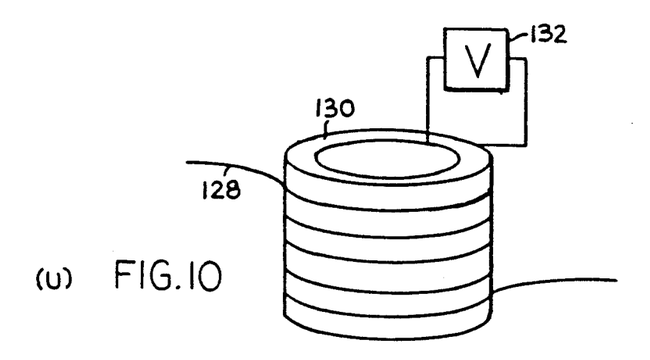
FIG. 10 illustrates a random pathlength generator for a fiber optic communications system.

The random pathlength generator can take many forms, the simplest being a fiber coil mounted on a piezoelectric cylinder. Random voltages would be introduced periodically that would cause the length of fiber wound around the cylinder to change by discrete elements. This configuration is shown in FIG. 10. A length of fiber 128 is wound about a piezoelectric cylinder 130. A random voltage generator 132 is used to rapidly charge the diameter of the piezoelectric cylinder 130 that in turn changes the optical pathlength through the fiber 128.

Figure 11:
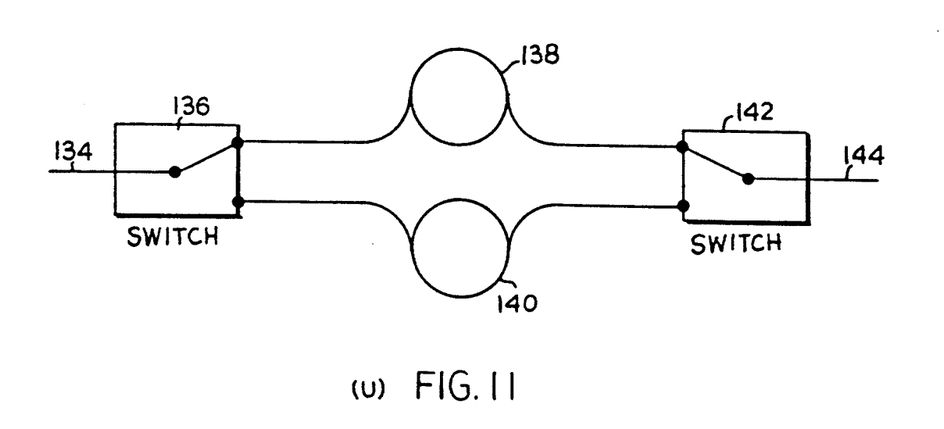
FIG. 11 illustrates a random pathlength generator utilizing single mode optical switches.

A more complex random pathlength generator that can be used to very rapidly switch between optical pathlengths is shown in FIG. 11. In this system a fiber 134 is used as an input to a single mode optical switch 136 that can be rapidly and discretely switched between two simple random pathlength generators 138 and 140 that are similar to the unit described in FIG. 10. An output optical switch 142 completes the optical path to the output fiber 144. The advantage of this system is that one of the fibers on the simple random pathlength generator such as 140 may be moved to a new optical pathlength while the other is in place, at which point the new pathlength may be switched in extremely rapidly. Using acousto-optic modulators as deflectors into the ends of adjacent optical fibers as switches or integrated optical techniques nanosecond switching would be possible. This makes the task of the potential intruder trying the track a random pathlength change extremely difficult.

The simple single loop configurations such as shown in FIGS. 1 and 9 may be built up into networks using interleaved loops.

Figure 12:
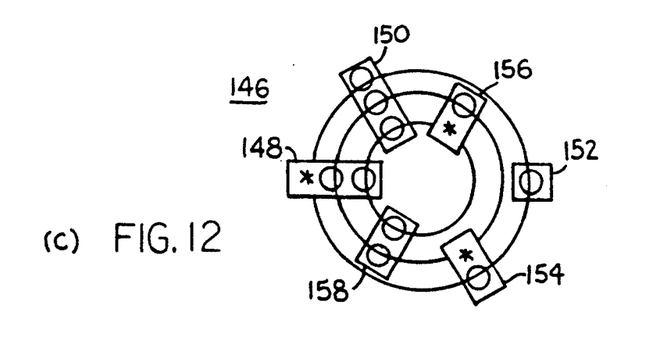
FIG. 12 illustrates fiber optic communications network comprising interleaved communications loops.

FIG. 12 illustrates a simple loop consisting of a receiving station and several transmitting stations. This may be combined with other similar loops into the multilayed ring structure 146. In this case the station 148 can receive from stations 150, 152 and 154, transmit to 154 and 156, but is unable to receive messages directly from 156 and 158. These rather complex networks can be built up to have interesting security features.

Figure 13:
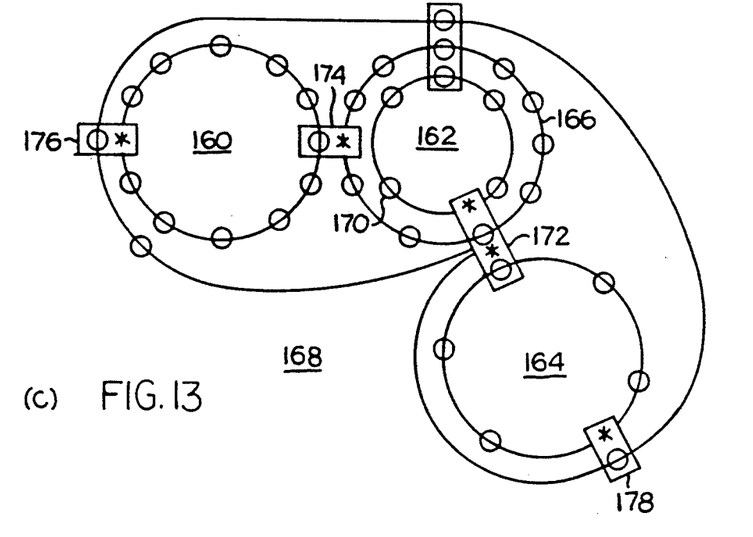
FIG. 13 illustrates a multi-loop fiber optic communications system.

FIG. 13 illustrates how the concept may be extended to multiple ring structures. Each communication ring 160, 164, and 166 is interconnected into an integrated loop or system 168. The sending stations such as 170 in ring 162 can transmit to receiver 172 which is also a transmitter connected in the rings 164 and 166. Thus station 172 allows the ring 162 to communicate with rings 166 and 164. Also, station 174 is connected to ring 166 as a receiver station and ring 160 as a transmit station. This arrangement allows ring 160 to communicate with users in ring 166. Station 176 allows ring 160 to transmit to ring 162 and 164. Finally, station 178 completes the system by allowing ring 164 to transmit to rings 162 and 166 via station 172 and ring 160 via stations 172 and 174. This is only an example of how multiple users may be interconnected in an integrated system.

Figure 14:
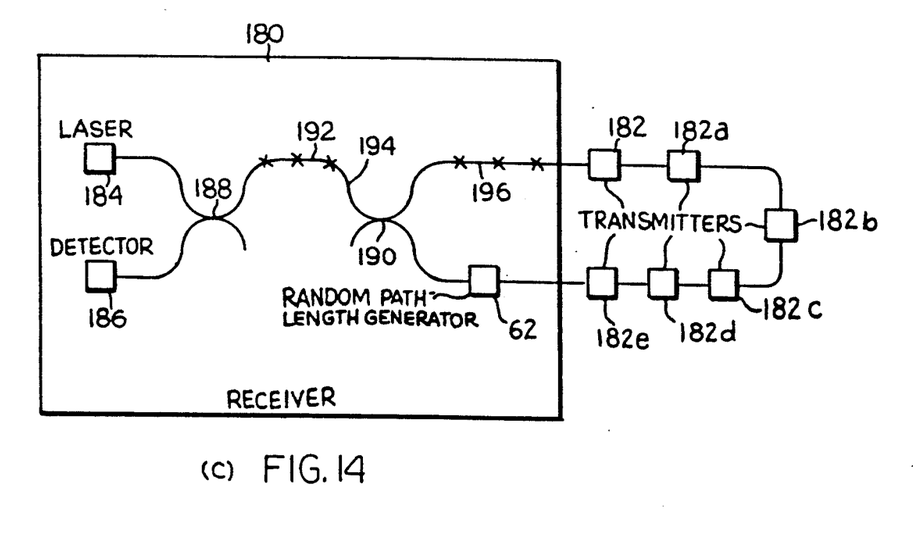
FIG. 14 illustrates a fiber optic communications system utilizing intensity maintenance elements.

As an example of the detailed design of a single loop system, FIG. 14 shows a configuration consisting of a receiver 180 and six transmitting/sending stations such as 182 and 182a–182e. Using specifications on components available today at an operating wavelength of 1.3 $\mu$m, a 21 kilometer, 140 Mbit/sec loop system may be constructed. The light source 184 may be a superradiant diode formed by using antireflection coatings on a buried crescent laser diode. The detector 186 is a Ge APD/GaAs FET transimpedance receiver. Fiber coupler 188 is a polarization preserving fiber coupler, while fiber coupler 190 is a conventional single mode fiber coupler. The polarizer 192 is a length of single polarization single mode fiber. Intensity maintenance units 194 and 196 are lengths of polarization preserving fiber oriented to scramble the polarization states of light propagating through the system. This procedure allows the usage of conventional single mode optical fiber. Alternatively, polarization preserving fiber may be used throughout the system. The intensity maintenance units consist of two lengths of polarization preserving fiber that are oriented at 45 degrees to one another and spliced into the system.

Table 1 provides a power budget for the single loop system of FIG. 14.

TABLE I

| | |
|---|---|
| Launched power | −19.6 dB |
| Splice losses | 1.8 dB |
| 3 at 0.2 dB | |
| 3 at 0.4 dB | |
| Fiber Coupler 1 | 3.1 dB |
| 3 dB | |
| +0.1 dB insertion loss | |
| Fiber Coupler 2 | 0.1 dB |
| 0.1 dB insertion loss | |
| Random Pathlength Generator | 3 dB |
| Six Sending Stations | 6.3 dB |
| 1 dB phase modulator | |
| 0.05 dB tap each | |
| Dispersion Penalty | 0.7 dB |
| System Margin | 2.6 dB |
| Fiber Loss | 8.4 dB |
| 21 km at 0.4 dB/km | |
| Receiver Sensitivity | 45.6 dB |

For simplicity, the sending stations consist of an integrated optical phase modulator and a fiber tap. The loss of the random pathlength generator of 3dB would reflect the more complex system of FIG. 11. The loss budget for the 21-Km loop is 8.4 dB, and the spacing of the stations about the loop is arbitrary, i.e., it could be uniform 3 Km spacing or there could be a 10-Km spacing between adjacent stations. Examples of cost performance trade-offs would include usage of a higher power light source, polarization preserving fiber or increasing the system margin above 2.6 dB. It is expected that, as the longer wavelength technology becomes better developed, the performance of a system of this type will increase in a corresponding fashion.

Figure 15:
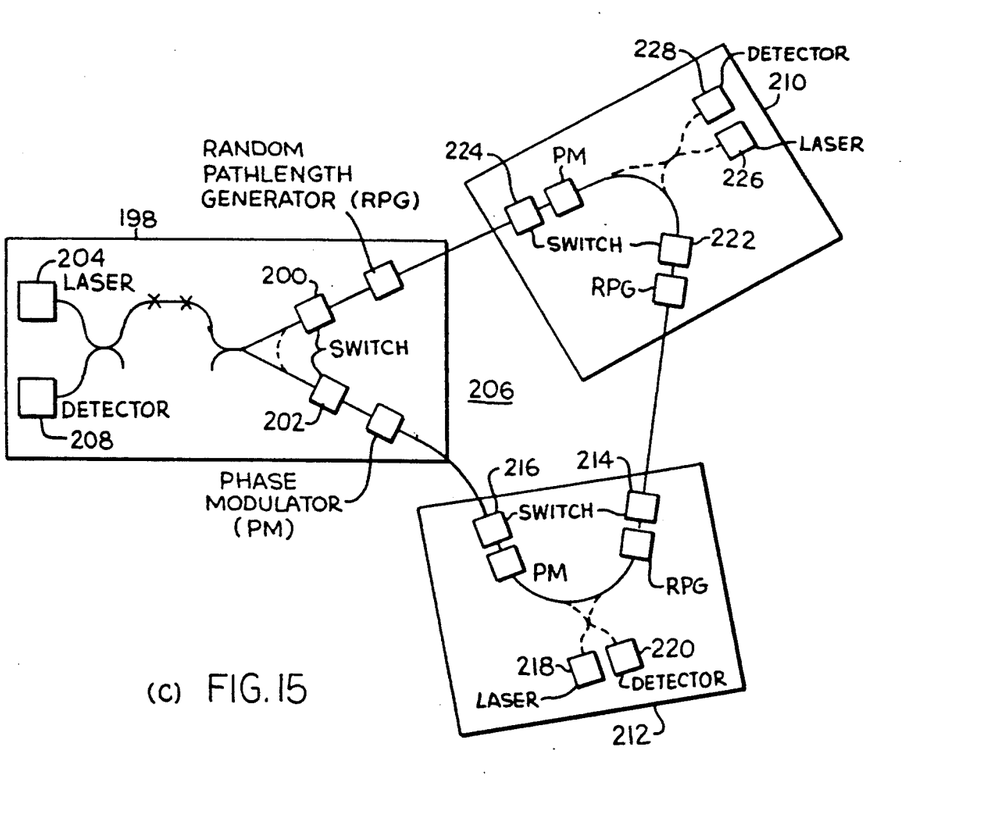
FIG. 15 illustrates a two-way fiber optic communications system.

In many cases it would be advantageous to have each station on the loop be capable of both receiving and transmitting data. FIG. 15 illustrates a networked system of this type. To simplify the figure, some elements of the receiving stations described in FIG. 14 have been omitted. Each module has a light source and detector such as 204 and 208 connected to a central beamsplitter that splits the light signal into counterpropagating beams that exit the module. Also, phase modulators PM impress the information on the beams and random path-length generators, RPG, are added for security. The receiving/transmitting station 198 is drawn so that it is in the receiver mode; that is, the single mode switches 200 and 202 are positioned so that the light source 204 is coupled into the loop 206 and the detector 208 receives the amplitude modulated signal from the combined propagating beams. Meanwhile, stations 210 and 212 are in the transmitting mode. Thus, for station 212 the switches 214 and 216 are arranged so that the light source 218 and detector 220 are bypassed while for station 210 the switches 222 and 224 are arranged so that the light source 226 and detector 228 are bypassed. The net result is that a simple loop is formed analogous to that illustrated by FIG. 14. When another station wants to receive this message, it is sent to the receiver, and control of the loop is transferred to the new station in the receiver mode by having the switches of that station go into the receiver mode from the transmit mode while the former receiver goes to the transmit mode. Information as to who is in or to be in control of the loop is sent via amplitude modulation of the light source of the receiver in control to the various receiver/transmitting stations on the loop via their fiber beamsplitter tap which can also double as the alarm system.

Figure 16:
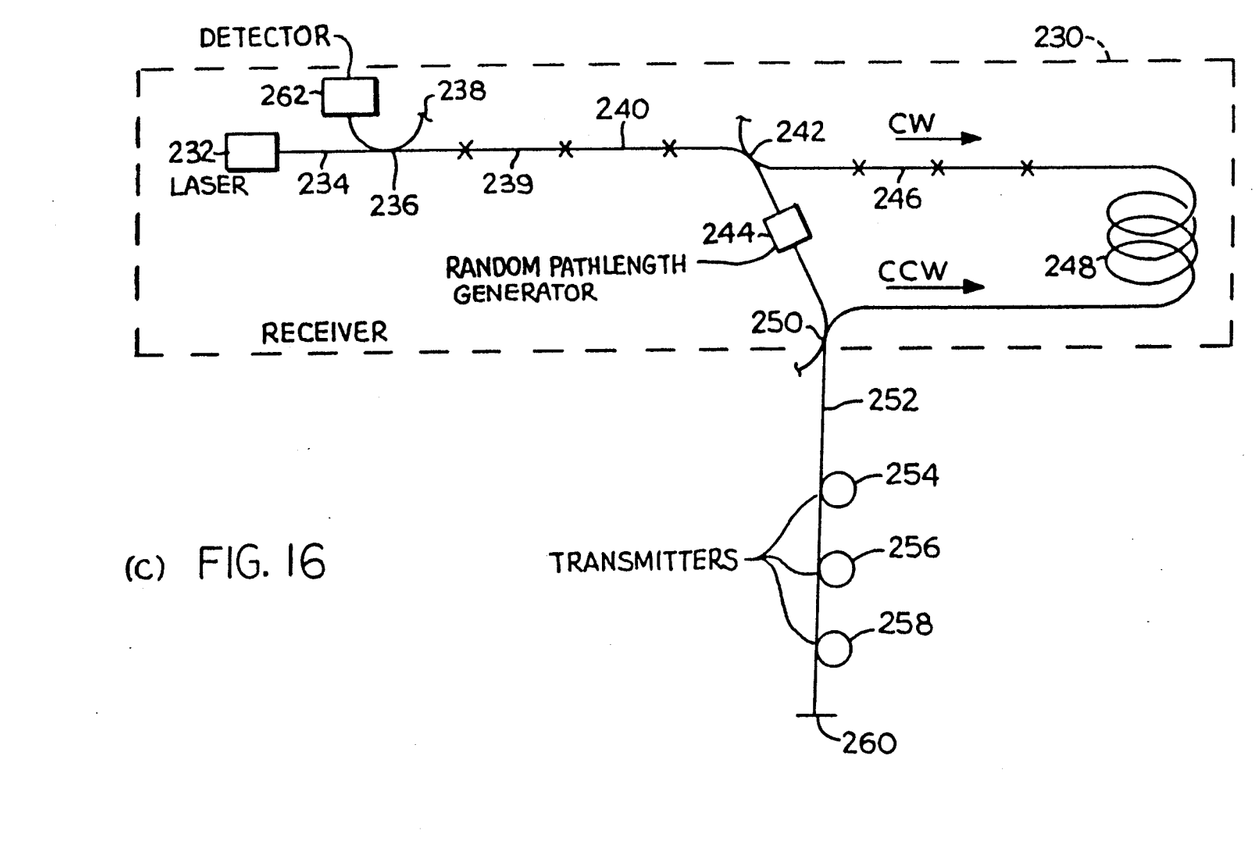
FIG. 16 illustrates a fiber optic communications system utilizing a single fiber transmission link.

It is also possible to convert the system to a single fiber transmission link between the receiver and transmitting/sending stations. FIG. 16 illustrates this type of system. The receiving station 230 consists of a broadband low coherence length light source 232 whose light is coupled into the fiber end 234 and directed into a fiber beamsplitter 236. One part of the light beam reaches the terminated port 238 that is designed to minimize back reflection into the detector. The other output beam of the fiber beamsplitter 236 is coupled into a polarizing fiber 238 that is used to ensure that both counterpropagating beams traverse the same path. An intensity maintenance unit 240 is used to scramble the polarization states before counterpropagating light beams are generated by the central beamsplitter 242. A random pathlength generator 244 and intensity maintenance unit 246 are included in the receiving unit and function in a manner similar to analogous elements described in association with the prior figures. A length of fiber 248 is included in the receiver to provide a time delay offset so that the counterpropagating light beams arrive at the transmitting stations at suitably separated time intervals. A fiber beamsplitter 250 is introduced into the loop. One end of the fiber beamsplitter may be terminated or alternatively used to generate other transmitting/sending stations One portion of the counterpropagating light beams is directed down the single fiber link 252. Several transmitting/sending stations would be set up on the link 252 such as 254, 256 and 258. A reflective end 260 is placed on the end of the fiber 252. The path of the cw propagating light beam is thus from the element 242 through 246, 248 to the splitter 250 reflected off the reflective end 260 and back to 250, 244 and 242. The ccw beam traverses the path in reverse order. Because of the short coherence length of the light source and offsets built into the loop by the fiber length 248, only the two beams that counterpropagate through the loop mix with sufficient coherence to produce an amplitude modulated signal at the fiber beamsplitter 242 which propagates through the elements 240, 238 and 236 to the output detector 262.

Figure 17:
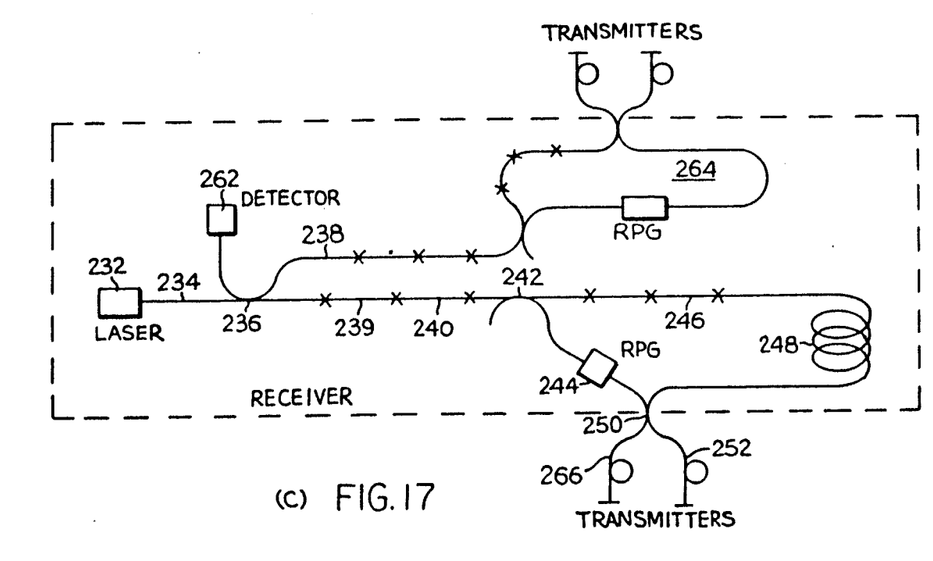
FIG. 17 illustrates a fiber optic communications system comprising multiple single line transmission links from a single light source.

Alternatively, the port 238 may be used as a light source for a second system as is shown in FIG. 17. By converting the fiber beamsplitter 236 into an NxN fiber coupler N, separate loops may be driven such as loop 264 added to the fiber beamsplitter end 238. Also, an additional fiber communications link 266, similar to link 252, may be added to the beam splitter 250. Care should be taken that the link lengths 252 and 266 are not equal on the order of a few coherence lengths to avoid possible interference. For systems using a short coherence length light source this would be extremely easy to do.

Figure 18:
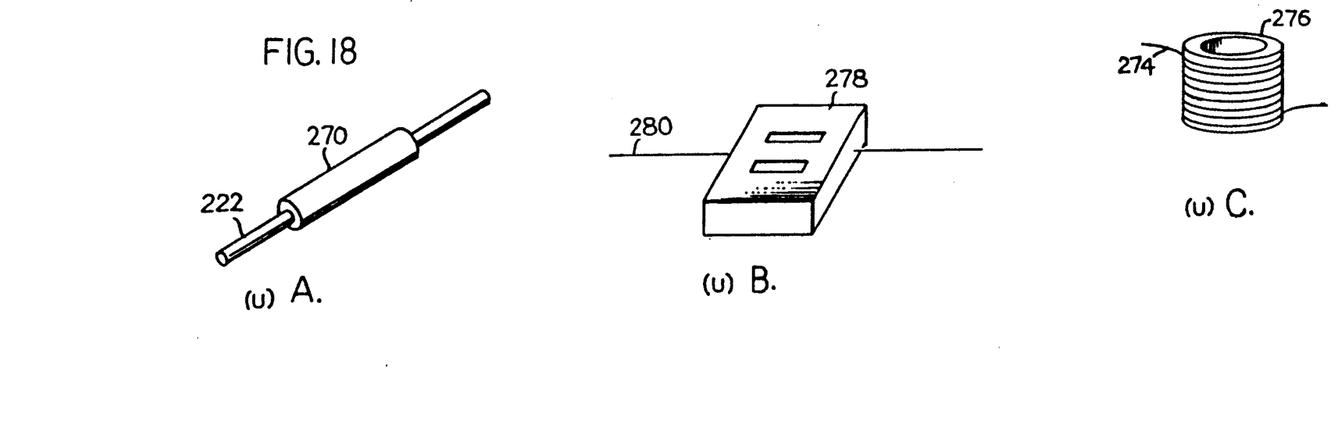

Various phase modulators that may be used in these configurations are shown in FIG. 18. In FIG. 18A, a transducer 270 may be deposited directly on the fiber 272. As the transducer is oscillated, the optical path through the fiber changes. In FIG. 18B, a fiber 274 may also be wrapped about a piezoelectric mandril 276 and the fiber length changed as voltages are applied to the mandril. In FIG. 18C, a third alternative is to use an integrated optical phase modulator 278 with pigtailed fiber leads such as 280.

To impress information onto the system using phase modulation where multiple sending transmitting stations are involved, several methods may be employed. One method is to run each station at a characteristic carrier frequency (perhaps 200 MHz, 300 MHz and 500 MHz) and frequency modulate the signal. A second method is simply to use time division multiplexing with each station accessing appropriate time slots. Other methods will be apparent to those skilled in the art.

Figure 19:
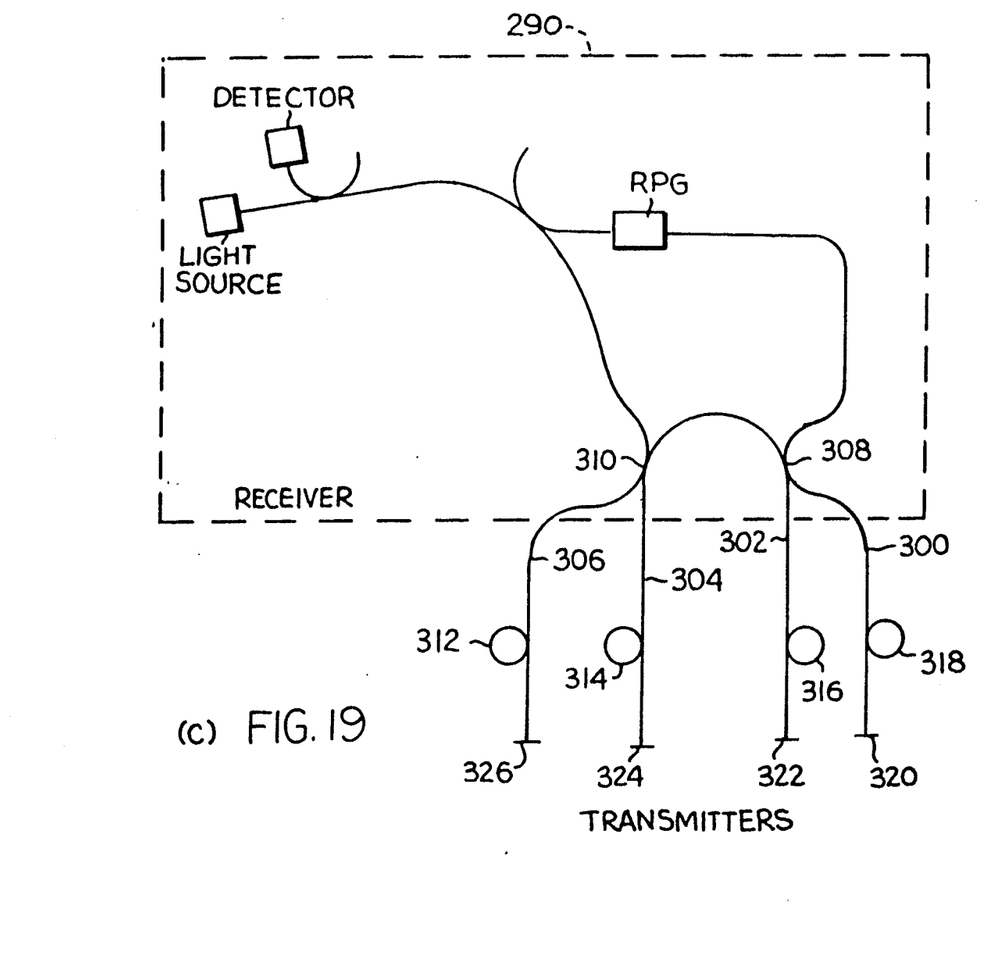
FIG. 19 illustrates a fiber optic communications system comprising a star coupler for multiple single line transmission links.

FIG. 19 shows a receiver 290 that is designed to support multiple single fiber transmission lines 300, 302, 304 and 306. To avoid possible crosstalk, the lengths of these lines would be chosen so that the difference in their lengths are much greater than the coherence length of the light source. This is particularly important for lines originating from the same fiber beamsplitter. In particular, the lines 300 and 302 which originate from the fiber beamsplitter 308 should have lengths that differ by at least several coherence lengths. Similar considerations apply to the lines 304 and 306 originating from the fiber beamsplitter 310. FIG. 18 illustrates the case of the usage of 2×2 fiber beamsplitters 308 and 310. It is also possible to use N×N fiber beamsplitters for 308 and 310 with N fiber transmission lines. The impression of data is by a series of transmitting/sending stations 312, 314, 316 and 318. Reflectors 320, 322, 324 and 326 are used to close the loop for the counterpropagating light beams. The impression of phase data onto the system is slightly more complicated than for the simple loop case of FIGS. 1 and 9 since the distance between the transmitting/sending station 312 and the fiber end reflector 326 will determine a second interval over which data may be impressed that in general will be much smaller than the time interval defined by the distance of the transmitting/sending station to its symmetry point on the loop. This results in a timing pattern within a timing pattern of a form similar to that of FIG. 3. To keep this pattern simple, the distance from each transmitting station (318, 316, 314, 312) to their respective end reflectors (320, 322, 324, 326) should be chosen to be a simple even fraction such as ½, ¼, ⅛, 1/16, etc., of the distance to the transmitting stations symmetry point on the fiber loop.

It can readily be seen that there is provided by this invention a novel fiber optic communications system based on the principles of the Sagnac interferometer that is intrusion resistant and can be accessed by a multitude of authorized users.

Although there has been illustrated and described specific detail and structure of operation, it is clearly understood that the same were merely for purposes of illustration and that changes and modifications may be readily made therein by those skilled in the art without departing from the spirit and scope of this invention.

What I claim is:

1. A fiber optic communication system comprising:
a) a light source means for inputting a beam of light into a beamsplitter means for splitting the light beam into counterpropagating light beams;
b) a detector means connected to the beamsplitter means for detecting the counterpropagating light beams;
c) a single intrusion resistant optical fiber loop connected to one output of the beamsplitter means for receiving a light beam propagating in a clockwise direction and the other end of the optical fiber loop connected to a second output of the beamsplitter means for receiving a light beam propagating in a counterclockwise direction;
d) a signaling means connected to the optical fiber loop for modulating an intelligence signal on the counterpropagating light beams; and
e) an electrical circuit means connected to the detector for demodulating the light beams detected thereon to receive the intelligence signal.

2. A fiber optic communications system as recited in claim 1 wherein the optical fiber loop the optical fiber loop is further comprised of polarization preserving fiber.

3. A fiber optic communications system as recited in claim 1 wherein a polarization preserving fiber is connected in a series relationship between the light source means and the beamsplitter means.

4. A fiber optic communications system as recited in claim 1 wherein the optical fiber loop as connected thereto a random pathlength generating means in a series relationship to the signal means for randomly changing the pathlength of the optical fiber loop.

5. A fiber optic communication system as recited in claim 1 wherein the signaling means is further comprised of light level alarm system for detecting changes in the amplitude of the counterpropagating light beams whereby a data formatter and driver means is shut down at a predetermined low light level limit.

6. A fiber optic communication system as recited in claim 5 wherein the light level alarm system is further comprised of color filtering means for attenuating all wavelength bands except the predetermined wavelength of the counterpropagating light beams.

7. A fiber optic communication system, comprising:
a) a light source means for inputting a beam of light into a first optical fiber;
b) a first beamsplitter means connected to the first optical fiber having one output connected to a detector and a second output connected to a polarizer and a series connected single mode spatial filter;
c) a second beamsplitter means connected to the output of the single mode spatial filter for splitting the light beam into counterpropagating beams, having one end of an intrusion resistant optical fiber loop connected to one output of the beamsplitter means for receiving a light beam propagating in a clockwise direction and the other end of the optical fiber loop for receiving a light beam propagating in a counterclockwise direction;
d) a plurality of signaling means each comprising a phase modulator, a random pathlength generator, and light level alarm connected to the optical fiber loop for modulating an intelligence signal on the counterpropagating light beams; and
e) an electrical circuit means connected to the detector for demodulating the light beams detected thereon to receive the intelligence signal.

8. A fiber optic communication system as recited in claim 7 wherein the random pathlength generating means is comprised of an optical fiber wrapped around a voltage driven piezoelectric mandril for changing the fiber length as the voltage changes.

9. A fiber optic communication system as recited in claim 7 wherein the random pathlength generating means is comprised of an optical switching means for periodic switching between a pair of parallel connected optical fibers wrapped around voltage driven piezoelectric mandrils for changing their respective fiber length as their respective voltages changes.

10. A fiber optic communication system as recited in claim 7 wherein the signaling means for modulating an intelligence signal on the counterpropagating light beams are phase modulators.

11. A fiber optic communication system as recited in claim 7 wherein the signaling means for modulating an intelligence signal on the counterpropagating light beams are frequency shifters.

12. A fiber optic communication system, comprising:
a. a plurality of communication lines disposed to be accessible by multiple users for transmitting or receiving intelligence;
b. each of the communication lines having:
a light source means for inputting a beam of light into a first optical fiber;
a first beamsplitter means connected to the first optical fiber having one output connected to a detector and a second output connected to a polarizer;
a second beamsplitter means connected to the output of the polarizer for splitting the light beam into counterpropagating beams, having one end of the communication line connected to one output of the beamsplitter means for receiving a light beam propagating in a clockwise direction and the other output connected to the communication line for receiving a light beam propagating in a counterclockwise direction;
signaling means connected to the communication line for modulating an intelligence signal on the counterpropagating light beams;
an electrical circuit means connected to the detector for demodulating the light beams detected thereon to receive the intelligence signal; and
c. the communication lines having common locations for signaling means or detectors whereby a user may have access to the plurality of communications lines for receiving or transmitting intelligence.

13. A fiber optic communication system as recited in claim 12 wherein the signaling means for modulating an intelligence signal on the counterpropagating light beams are phase modulators.

14. A fiber optic communication system as recited in claim 12 wherein the signaling means for modulating an intelligence signal on the counterpropagating light beams are frequency shifters.

15. A fiber optic communication system, comprising:

a) a light source means for inputting a beam of light into a first optical fiber;

b) a first beamsplitter means connected to the first optical fiber having one output connected to a detector means for receiving a portion of the light beam and a second output connected to a single mode spatial filter for receiving the remaining portion of the light beam;

c) a second beamsplitter means connected to the output of the single mode spatial filter having a second optical fiber connected to one output of the second beamsplitter means for receiving a light beam propagating in a clockwise direction and a third optical fiber connected to a second output of the second beamsplitter means for receiving a light beam propagating in a counterclockwise direction;

d) a third beamsplitter means having one input connected to the end of the second optical fiber for receiving the counterclockwise light beam and another input connected to the end of the third optical fiber for receiving the clockwise light beam forming a loop for counterpropagating light beams;

e) a fourth optical fiber connected to the output of the third beamsplitter means for receiving the counterpropagating light beams and having connected thereto a series of signal means for modulating an intelligence signal on the counterpropagating beams;

f) a reflecting means connected to the end of the fourth optical fiber for reflecting the modulated counterpropagating beams back to the detector means; and g) electrical circuit means connected to the detector means for demodulating the light beams detected to receive the intelligence signal.

16. A fiber optic communication system as recited in claim 15 wherein the third beamsplitter means is a star coupler for connecting a multitude of optical fibers, each having signal means for modulating an intelligence signal on the counterpropagating beams.

17. A fiber optic communication system as recited in claim 15 wherein the signal means for modulating an intelligence signal on the counterpropagating beams are phase modulators.

18. A fiber optic communication system as recited in claim 15 wherein the signal means for modulating an intelligence signal on the counterpropagating beams are frequency shifters.

19. A fiber optic communication system as recited in claim 15 wherein the first beamsplitting means is a star coupled beamsplitter for connecting a plurality of communications lines onto the light source means.

20. A transmitting/receiving station for use with a fiber optic communication system, comprising:

a) a light source means for inputting a light beam into one input of a beamsplitter means for splitting the light beam into counterpropagating light beams;

b) a detector means connected to the beamsplitter for receiving the counterpropagating light beams;

c) optical switching means connected to the output of the beamsplitter means for bypassing the light source means and the detector means whereby the transmitting/receiving station is in the transmit mode;

d) a pair of optical fibers connected to the output of the optical switching means forming a loop for the counterpropagating light beams;

e) signaling means connected to at least one of the optical fibers for modulating an intelligence signal on the counterpropagating light beams; and f) an electrical circuit means connected to the detector means for demodulating the light beams detected thereon to receive the intelligence signal.

21. A transmitting/receiving station for use with a fiber optic communication system as recited in claim 20 wherein at least one of the optical fibers has connected thereto a random pathlength generating means for randomly changing the pathlength of the counterpropagating beams.

22. A transmitting/receiving station for use with a fiber optic communication system as recited in claim 21 wherein the signaling means is generally comprised of a data formatter and driver means for impressing data on the counterprogating light beams.

23. A transmitting/receiving station for use with a fiber optic communication system as recited in claim 22 wherein the signaling means is further comprised of light level alarm system for detecting changes in the amplitude of the counterpropagating light beams whereby the data formatter and driver means is shut down at a predetermined low light level limit.

24. A transmitting/receiving station for use with a fiber optic communication system as recited in claim 23 wherein the light level alarm system is further comprised of color filtering means for attenuating all wavelength bands except the predetermined wavelength of the counterpropagating light beams.

25. A transmitting/receiving station for use with a fiber optic communication system as recited in claim 24 wherein the random pathlength generating means is comprised of an optical fiber wrapped around a voltage driven piezoelectric mandril for changing the fiber length as the voltage changes.

26. A transmitting/receiving station for use with a fiber optic communication system as recited in claim 25 wherein the random pathlength generating means is comprised of an optical switching means for periodic switching between a pair of parallel connected optical fibers wrapped around voltage driven piezoelectric mandrils for changing their respective fiber length as their respective voltages changes.

27. A transmitting/receiving station for use with a fiber optic communication system as recited in claim 22 wherein the signaling means for modulating an intelligence signal on the counterpropagating light beams are phase modulators.

28. A transmitting/receiving station for use with a fiber optic communication system as recited in claim 27 wherein the signaling means for modulating an intelligence signal on the counterpropagating light beams are transducers means deposited directly on the optical fiber loop for oscillation by a driver.

29. A transmitting/receiving station for use with a fiber optic communication system as recited in claim 27 wherein the signaling means for modulating an intelligence signal on the counterprogating light beams is an optical fiber wrapped around a voltage driven piezoelectric mandril for changing the fiber length as the voltage changes.

30. A transmitting/receiving station for use with a fiber optic communication system as recited in claim 27 wherein the signaling means for modulating an intelligence signal on the counterpropagating light beams is an integrated optical phase modulator.

31. A transmitting/receiving station for use with a fiber optic communication system as recited in claim 22 wherein the signaling means for modulating an intelligence signal on the counterpropagating light beams are frequency shifters.

32. A transmitting/receiving station for use with a fiber optic communication system as recited in claim 31 wherein the signaling means for modulating an intelligence signal on the counterpropagating light beams are acousto-optic modulators.

33. A transmitting/receiving station for use with a fiber optic communication system as recited in claim 20 wherein a polarization preserving fiber and a second beamsplitter is connected in a series relationship between the first light source and the beamsplitting means for splitting the light beam into counterpropagating light beams.

34. A plurality of transmitting/receiving station for use with a fiber optic communication system, each comprising:
 a) a light source means for inputting a light beam into one input of a beamsplitter means for splitting the light beam into counterpropagating light beams;
 b) a detector means connected to the beamsplitter for receiving the counterpropagating light beams;
 c) optical switching means connected to the output of the beamsplitter means for bypassing the light source means and the detector means whereby the transmitting/receiving station is in the receive mode;
 d) a pair of optical fibers connected to the output of the optical switching means forming a loop for the counterpropagating light beams;
 e) signaling means connected to at least one of the optical fibers for modulating an intelligence signal on the counterpropagating light beams;
 f) an electrical circuit means connected to the detector means for demodulating the light beams detected thereon to receive the intelligence signal; and
 g) connected whereby the pairs of optical fibers form a communications loop connecting the plurality of transmitting/receiving station in a series loop such that each station may receive intelligence or transmit intelligence.

* * * * *